July 5, 1960  C. G. HÅRD AF SEGERSTAD  2,943,477
MEASURING APPARATUS
Filed April 24, 1958
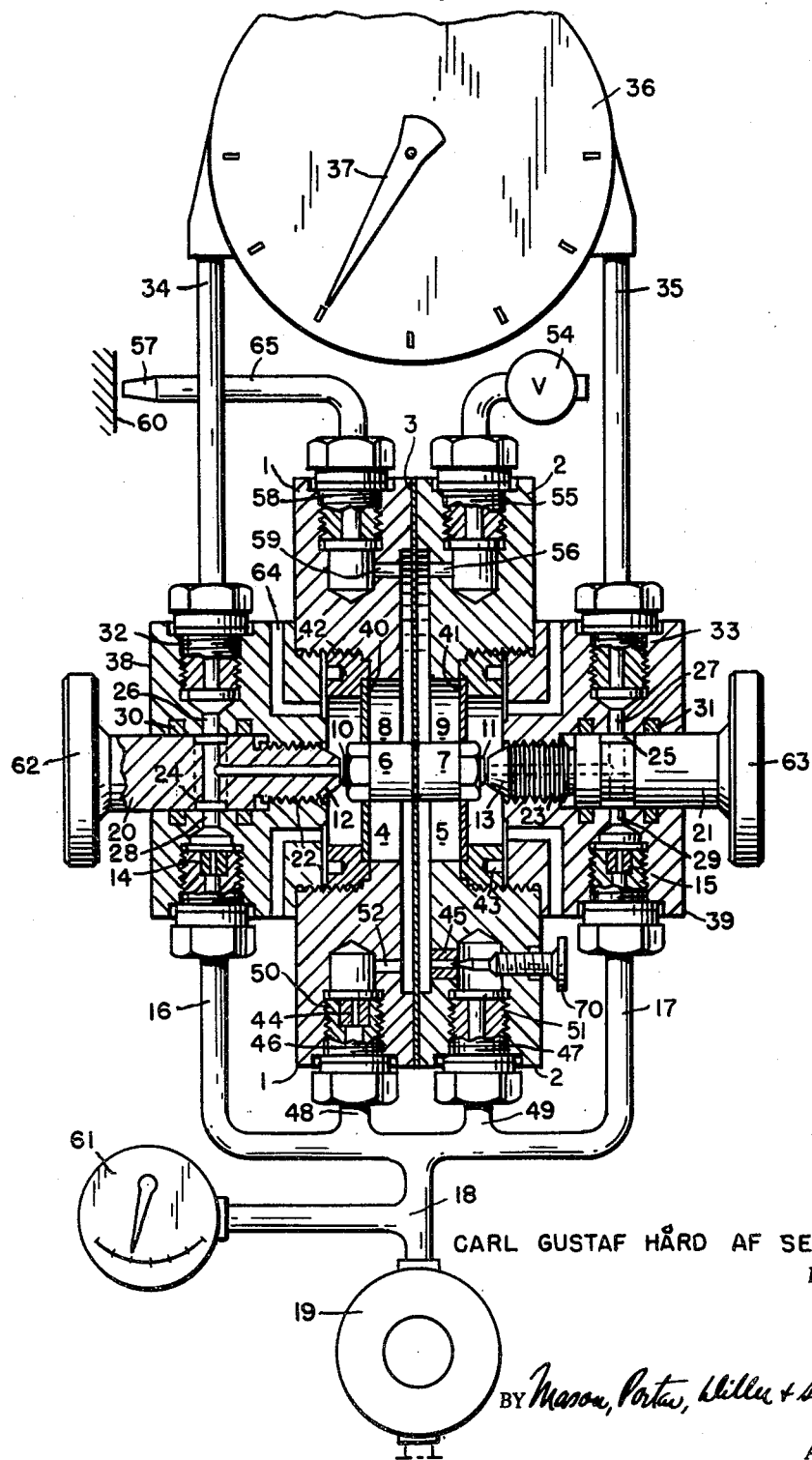
CARL GUSTAF HÅRD AF SEGERSTAD
INVENTOR
BY Mason, Porter, Diller + Stewart
ATTORNEYS United States Patent Office 2,943,477
Patented July 5, 1960

2,943,477
MEASURING APPARATUS

Carl Gustaf Hård af Segerstad, Sandviken, Sweden, assignor to Sandvikens Iernverks Aktiebolag, Sandviken, Sweden, a Swedish joint-stock company Filed Apr. 24, 1958, Ser. No. 730,645

4 Claims. (Cl. 73—37.5)

The present invention relates to a measuring apparatus which may be used for measuring or indicating any physical magnitude.

The main object of the invention is to produce a measuring apparatus which is capable of measuring for example, mass manufactured articles very quickly and with a superior degree of accuracy and sensitivity.

According to a principal feature of the invention the new measuring apparatus comprises in combination two pressure chambers connected to a source of pressure, one of the said two chambers being connected to an outlet opening adapted to be controlled in dependence on any physical magnitude, an outlet opening of the other chamber being adjustable for example, by a valve in order to set a balance between the pressures in the two chambers at a predetermined or desired value of the physical magnitude, the two chambers being separated from each other by a membrane carrying two members adapted to restrict the outlet openings of two jets or nozzles connected to a source of pressure and arranged one on each side of the membrane and separated from the chambers, the two jets being connected to an indicator or meter arranged to indicate the difference between the pressures at the jets.

This and other features of the invention will be disclosed more in detail in the following description, reference being had to the accompanying drawing which shows by way of example and in no limiting sense an embodiment of the invention.

The body or frame of the measuring apparatus is shown composed of two sections 1 and 2 held together by any suitable means not shown in the drawing. Between the two sections 1 and 2 is clamped a membrane, diaphragm or resilient partition wall 3 which separates two chambers 4 and 5 in the body 1, 2 from each other. At its middle portion the membrane 3 carries two collars 6 and 7 clamped together by a through bolt and nuts 8 and 9. The two ends of the bolt form members 10, 11 which are adapted to restrict outlet openings of each of two jets 12, 13 respectively both of which are connected through restricted openings 14, 15 respectively through lines 16, 17 and 18 to a common source of fluid pressure medium which may be liquid or gaseous. Preferably, a constant pressure regulator 19 and a pressure control meter 61 are incorporated in the line 18 to the source of pressure which is not shown.

The jets 12 and 13 form the ends of the stems of T-canals formed in members 20 and 21 respectively which are in screw-threaded engagement 22 and 23 with frame parts 38 and 39 respectively which in turn are threaded into the body parts 1 and 2 respectively. The members 20 and 21 are adjustable in respect of their positions relative to the restricting or throttling members 10 and 11 respectively by turning the knobs 62 and 63 in order to be able to vary the sensitivity of the whole measuring device. The cross portions of the T-canals are arranged at portions 24, 25 respectively of reduced diameter which are arranged opposite to openings 26, 27 and 28, 29. On each side of these portions sealing rings 30, 31 respectively are placed in grooves in the frame parts 38 and 39 and tightened against the members 20 and 21, so as to provide tight connections to the restricted openings 14 and 15 on one hand and to connections 32 and 33 on the other hand and further through lines 34 and 35 to a pressure differential meter or gauge 36. This meter 36 is adapted to indicate, by its pointer 37 on a scale, the pressure differences caused by the restricting members 10 and 11 at the outlets 12 and 13 respectively.

The influence of the members 10 and 11 on the outlets 12 and 13 respectively is, in turn, dependent on the pressure difference between the two chambers 4 and 5, which pressure difference determines the position of the membrane 3 with its members 10 and 11. The compartments surrounding the outlets 12 and 13 and formed by the diaphragms 40 and 41 communicate through passages 64 with the surrounding atmosphere.

The chambers 4 and 5 are thus bounded by the two additional membranes or diaphragms 40 and 41 which are held in firm grip against shoulders, formed in the body parts 1 and 2, by means of ring members 42 and 43 respectively. The chambers 4 and 5 receive their pressures through constricted openings in jets 44 and 45 respectively. Connections 46 and 47 serve to connect these jets to branch lines 48 and 49 respectively communicating with the pressure supply line 18 mentioned above. The connections 46 and 47 are inserted into threaded bores 50 and 51 in the parts 1 and 2 respectively. The bore 50 communicates with chamber 4 through a passage 52, while the jet 45 is inserted in an opening to chamber 5, corresponding to the opening 52 to chamber 4.

A needle valve member 70 mounted in the wall of the body part 2 can be used to restrict the opening in the jet 45 more or less and thereby the inlet into the chamber 5 when required.

As will be readily understood, a higher pressure in the chamber 4 than in the chamber 5 will force the membrane 3 and its restricting members to the right in the drawing from the normal or median position shown which represents an equilibrium between the pressures in the two chambers with the same restriction at both of the two outlets 12 and 13. A higher pressure in the chamber 5 will force the said membrane and members in the opposite direction, i.e. to the left from the median position.

The required or desired equilibrium is attained or set by means of the above-mentioned needle valve 70 controlling the inlet into the chamber 5 or by means of a bleed or relief valve 54 connected to the chamber 5 through a connection 55 and a passage 56 in respect of any pressure in the chamber 4 which depends on the constricting or throttling action at an outlet nozzle 57 which communicates with the chamber 4 through a line 65 and a connection 58 inserted into the body part 1 and a passage 59. When the pressures in the two chambers 4 and 5 are identical the equilibrium is established and the pointer 37 is normally arranged then to give a zero reading. This indicates that a physical magnitude by which the outlet nozzle 57 is constricted is likewise at a zero or normal value which has been chosen and set by means of the needle valve 70 and/or the bleed valve 54 and, if necessary, by the knobs 62, 63.

The physical magnitude may be of quite an arbitrary nature. In the simple example indicated in the drawing the physical magnitude is represented by a surface 60 of any mass-produced article the measure of which is to be checked or tested. The said surface 60 performs the above-mentioned constriction or throttling of the outlet of the nozzle 57. When the measure is the ideal or prescribed one the pressure equilibrium is attained or maintained between the chambers 4 and 5 and the pointer 37 indicates a zero reading. If, however, the measure of the article differs from the ideal value, the equilibrium is disturbed through a changed throttling effect at the outlet 57 and the pointer gives an immediate corresponding reading.

A very useful feature of the above described measuring apparatus according to the invention consists in that the cooperation between the members 10 and 11 which are movable together and the outlets 12 and 13 results in a very considerable amplifying effect, as a very minute change of the throttling at the outlet 57 and hence also a very minute pressure difference between the chambers 4 and 5 will cause a very high pressure difference between the passages behind the outlets 12 and 13, acting also on the meter 36 which accordingly may be of ample dimensions, if required. The high pressure difference is caused by the circumstance that when the restriction of one of the outlets 12 and 13 is increased the throttling of the other is at the same time reduced and vice versa.

It is to be understood that the embodiment shown in the drawing and described above is given only as an example, because many other embodiments are possible within the scope of the invention.

Thus, it is obvious that a gauge or meter may be connected to one or both of the chambers 4 and 5 for checking or setting the pressures in these chambers, in order to calibrate the whole apparatus. The meter 36 could advantageously be used for this purpose and be connected, when required, to the chambers 4 and 5 by means of so called three-way valves incorporated in the lines or pipes 34 and 35 and the necessary additional lines from these valves to the chambers 4 and 5. Such a connection between a meter of pressure differences and both of the chambers 4 and 5 makes it possible to perform measuring operations using only the pressures in these chambers and not the effect of the members 10, 11 and the outlets or nozzles 12, 13. In such a form of measuring thus only "one step amplification" is used, in contrast to the "two stage amplification" when the pressure difference at the outlets 12 and 13 is used. The former measuring may be advantageous for coarser objects and articles, the latter for measuring of great accuracy.

It is of course also possible to choose another zero setting than the above-mentioned equilibrium in respect of the pressures in the two chambers 4 and 5. Thus, the pressure in one of these chambers may be higher than in the other at the zero setting.

Further, it is possible, instead of throttling the outlet (57) of one of the chambers 4, 5 in dependence on the physical magnitude to be measured or controlled, to throttle the inlet of one of the chambers 4, 5 according to variations of this magnitude. Thus a feeler member may be arranged to perform a variable restriction of the jet 44 or the needle valve 70 may be accordingly actuated by the magnitude.

What I claim is:

1. A measuring apparatus comprising a two-part body, two opposing central chambers in the parts of the body, a compartment adjacent each central chamber, a common resilient diaphragm separating the central chambers, a valve member mounted centrally in the diaphragm having opposite ends, one in each compartment, a jet in each compartment opposite each end of the valve member, a common supply of pressure fluid to both central chambers and to both jets, a differential pressure gauge, a by-pass from each jet to the opposite sides of said gauge, a pressure relief valve of predetermined value from one central chamber and a discharge nozzle from the other central chamber responsive to the proximity of the article being measured.

2. A measuring apparatus, as claimed in claim 1, in which the connections between the jets and the supply of pressure fluid each includes a restricted opening.

3. A measuring apparatus, as claimed in claim 1, in which the jets are adjustable in respect of their relationship to the valve member carried by the diaphragm.

4. A measuring apparatus, as claimed in claim 1, in which the connections between the two chambers and the supply of pressure fluid each incorporates a restricted opening.

References Cited in the file of this patent
UNITED STATES PATENTS 2,065,702     Hubbard _____ Dec. 29, 1936
2,777,257     Johnson _____ Jan. 15, 1957